United States Patent [19]

Murahashi et al.

[11] Patent Number: 4,926,195
[45] Date of Patent: May 15, 1990

[54] IMAGE RECORDING APPARATUS

[75] Inventors: Takashi Murahashi; Hisao Fujita; Toshihiko Nakazawa; Toshihiro Takesue; Toshihiro Motoi, all of Hachioji, Japan

[73] Assignee: Konica Corporation, Tokyo, Japan

[21] Appl. No.: 193,959

[22] Filed: May 13, 1988

[30] Foreign Application Priority Data

May 14, 1987 [JP] Japan .................. 62-117684

[51] Int. Cl.$^5$ .......................................... G01D 15/14
[52] U.S. Cl. .................................................. 346/108
[58] Field of Search ................. 346/108, 160; 350/6.5, 350/6.6, 6.7, 6.8, 6.9

[56] References Cited

U.S. PATENT DOCUMENTS

4,715,699 12/1987 Morimoto ............................ 350/6.8
4,756,584 7/1988 Takanashi ........................... 350/6.8

Primary Examiner—Bruce A. Reynolds
Assistant Examiner—Mark Reinhart
Attorney, Agent, or Firm—Jordan B. Bierman

[57] ABSTRACT

A light beam recording system in which the beam is deflected after passage through a focusing element to scan a recording medium. An optical image surface correction system is employed between the deflector and recording medium for correction of the curvature of the field in the main scanning direction. The optical correction system includes an aspherical surface and deviation from a paraxial generating spherical surface to the aspherical surface.

13 Claims, 12 Drawing Sheets

CURVATURE OF FIELD
IN MAIN SCANNING DIRECTIONS

CURVATURE OF MAIN
SCANNING IMAGE SURFACE

CURVATURE OF SUB-
SCANNING IMAGE SURFACE

IMAGE RECORDING APPARATUS

BACKGROUND OF THE INVENTION

1. Field of the Invention

The present invention relates to an image recording apparatus such as an electrophotographic color copying machine and a laser printer and more particularly to an optical scanning device for use in the image recording apparatus.

2. Description of the Prior Art

In an electrophotographic color copying machine or the like, an optical scanning device (laser beam scanner device) using a semiconductor laser is often used as a means for forming an electrostatic latent image on a photosensitive image forming body by an image signal corresponding to an original.

When a laser beam scanner device is employed, a compact, inexpensive semiconductor laser can be used as a light source for an image forming apparatus, and a clear color image can be recorded.

Figure 1:
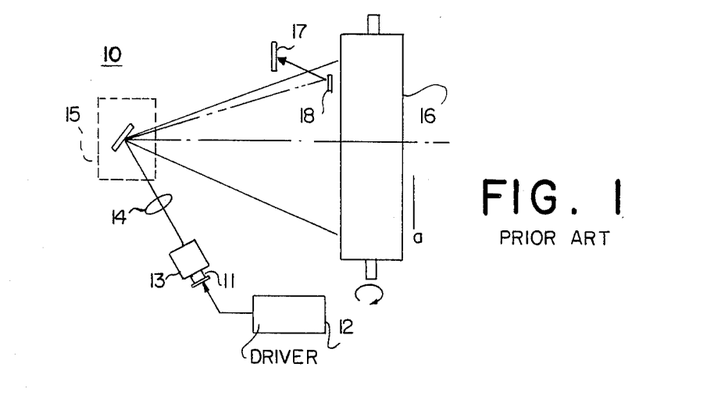
FIG. 1 is a diagrammatical illustration of a conventional optical scanning device of post-objective type.

FIG. 1 shows an example of a laser scanner device 10 using a semiconductor laser, wherein a post-objective type optical system is used as an optical system.

The post-objective type optical system is an optical system in which a beam is focused by a condenser lens, and is then incident on a light deflector, as will be described later.

In FIG. 1, a semiconductor laser 11 is optically modulated based on a drive signal corresponding to color separation data (e.g., binary data) obtained from a driver 12.

A laser beam emitted from the laser 11 is incident on a light deflector 15 through a collimator lens 13 and a condenser lens 14 as a focusing element.

The laser beam deflected by the light deflector 15 is radiated on the surface of an image forming body (photosensitive drum) 16. In this case, the surface of the image forming body 16 is scanned in a predetermined direction a at a constant speed, so that an exposed image corresponding to the color separation data is formed on the image forming body 16.

After exposure, an electrostatic latent image is developed by toner supplied from a developer (a plurality of developers are provided in the case of a multi-color image), and is then fixed, thereby recording an image on a recording sheet.

Note that reference numeral 17 denotes a photosensor, which receives the laser beam reflected by a mirror 18 so as to obtain an index signal indicating the beginning of scanning of the laser beam. Image data for one line is written based on the index signal.

When the post-objective type optical system is used as an optical system, since a beam is subjected to convergence before deflection, the condenser lens 14 poses only a problem of axial image formation, resulting in a simple structure.

Figure 2:
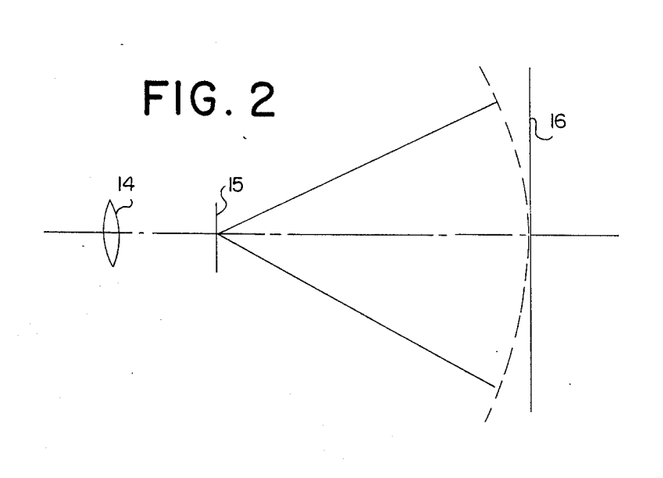
FIG. 2 is a view for explaining a deflection operation of the conventional optical scanning device.

However when the post-objective type optical system is used, a convergent point is normally located on a curved plane, as indicated by a broken line in FIG. 2. Therefore, in practice, the curvature of field must be corrected by any means.

A pre-objective type optical system is normally used in consideration of the above problem.

Figure 3:
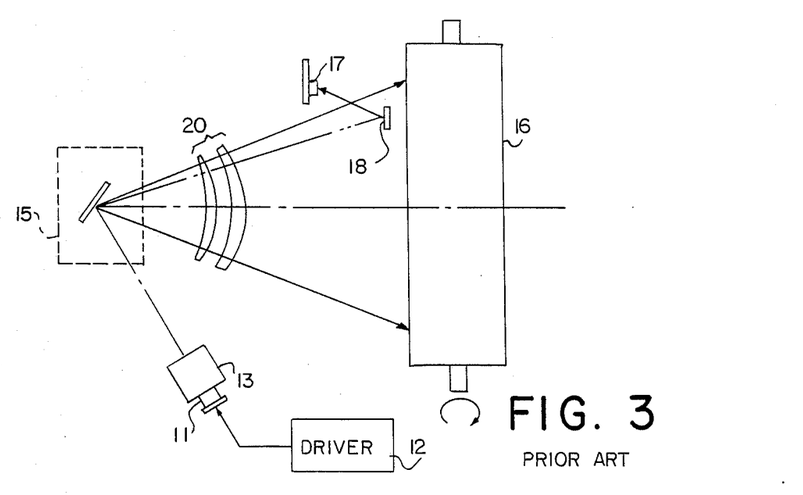
FIG. 3 is a diagrammatical illustration of another conventional optical scanning device of pre-objective type.

As shown in FIG. 3, in the optical system of this type, a condenser lens is omitted, and instead, focusing lenses 20 are arranged between the light deflector 15 and the image forming body 16.

As the focusing lenses 20, a $\sin^{-1}\theta$ lens constituted by two lenses as in this example is used.

When the pre-objective type optical system is used, the focusing lenses 20 must be arranged to meet the following requirements. That is, an image must be precisely formed on the image forming body 16, a beam must scan the image forming body 16 at a constant speed, the curvature of field and distortion must be reliably corrected, and so on. The focusing lenses must be arranged to function as a wide-angle lens capable of covering a beam deflection angle.

Therefore, in a beam scanner device having the preobjective type optical system, the focusing lenses 20 must be precisely machined, resulting a very expensive optical system.

In the post-objective type optical system, an inexpensive condenser lens can be used, while some countermeasure for a curvature of field must be taken. When the pre-objective type optical system is used, although the curvature of field can be effectively corrected, an expensive focusing lens must be used.

According to the present invention, it is possible to flatten a focusing surface with a single lens which is arranged between the light deflector and the surface to be scanned. There is an example of flattening of the image surface by diverged light incident on the light deflector and by use of Petzval sum of the single lens, but angle of view of as small as 16° is obtained. There is another example of flattening of only curvature of field with a single lens by ignore Coma aberration, as an optical system of a laser beam printer has small aperture ratio. However, surface shape is complicated and machining is difficult.

SUMMARY OF THE INVENTION

It is an object of the invention to provide an image recording apparatus having an optical scanning device of post-objective type which is provided with an image surface correction optical means.

It is another object of the invention to provide an image recording apparatus having an optical scanning device in which an image surface is corrected with an inexpensive optical means.

It is further object of the present invention to provide an image recording apparatus whose light scanning optical system is inexpensive and half angle of view is approximately 26° and wherein curvature of field is flattened both in the main scanning direction and in the sub-scanning direction.

According to the present invention, a post-objective type image recording apparatus has a light deflector for deflecting a light beam passing through a focusing element in a predetermined direction, and a recording medium is scanned with the light beam deflected by the light deflector to record predetermined image information, and the image surface correction optical means for a main scanning direction is arranged between the light deflector and the recording medium, and a curvature of field in the main scanning direction is corrected by the image surface correction optical means.

In the present invention, an example of the image surface correction optical means is a lens having at least one aspherical surface. Preferably, the lens has a modified cylindrical surface.

The modified cylindrical surface is a kind of Anamorphic surface, and in the present invention, is a surface whose radius of curvature in the sub scanning direction increases with a distance from a light axis. More particularly, the modified cylindrical surface has such shape that a sub scanning section has a radius of curvature determined by the length from a revolution axis l.

DETAILED DESCRIPTION OF THE PREFERRED EMBODIMENTS

An embodiment of an optical scanning device according to the present invention will be described with reference to FIG. 4 and following drawings. As a light source, a semiconductor laser is used.

Figure 4:
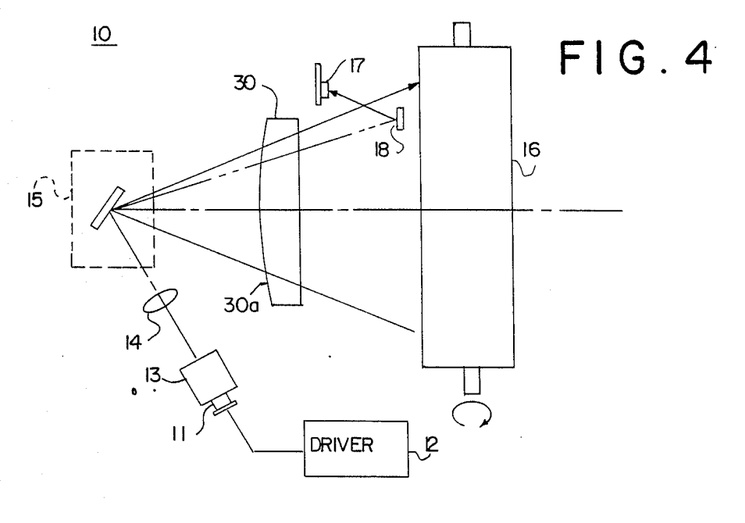
FIG. 4 is a diagrammatical illustration of an embodiment of an optical scanning device for use in an image recording apparatus according to the present invention.

An optical scanning device according to the present invention, i.e., a laser beam scanner device 10 is constituted by a post-objective type optical system, as shown in FIG. 4.

Reference numeral 11 denotes a semiconductor laser as has been described above. The laser 11 is optically modulated based on a drive signal corresponding to color separation data.

A laser beam is incident on a light deflector 15 through a collimator lens 13 and a condenser lens 14 as a focusing element.

Since the condenser lens 14 deals with only axial image formation, its lens structure is very simple.

As the light deflector 15, a mirror scanner comprising a rotary polygonal mirror, a galvano mirror, a light deflecting element, and the like can be used.

The light deflecting element has an identical construction to that of the galvano mirror, and is prepared by integrally molding a reflection mirror, a driving coil, and a ligament. The light deflecting element is formed of a material such as a quartz plate which is easily etched and has a large elastic modulus.

Between the condenser lens and the light deflector, a cylindrical lens which has a curvature against the sub-scanning profile may be positioned.

It is also possible to dispense with the condenser lens 14 by unifying the collimator lens 13 and the condenser lens 14 and focusing the callimator lens 13 to provide converged light rather than paralleled light. The cylindrical lens may be positioned between the callimator lens and the condenser lens.

The surface of an image forming body (photosensitive body) 16 is exposed by the laser beam deflected by the light deflector 15.

In this invention, an optical means 30 for correcting a curvature of field is provided along the optical path between the light deflector 15 and the image forming body 16. When the post-objective type is employed, if no image surface correction is performed, a curvature of field and shown in FIG. 2 are left unremoved.

In an aspherical surface, a deviation $\Delta Z$ from a paraxial generating spherical surface to the aspherical surface of an aspherical lens is represented by the following formulae:

$$\Delta(Y_j) = \Sigma\{\Delta Z_{ij1}(\phi_{ij1}) - \Delta Z_{ij2}(\phi_{ij2})\}$$

where $Y_j, Y_k$: image height on recording medium $\Delta Z_{ij1}(\phi_{ij1})$: aspherical surface deviation at input surface of i-th image surface correction optical means at $\phi_{ij1}$.

$\Delta Z_{ij2}(\phi_{ij2})$: aspherical surface deviation at output surface of i-th image surface correction optical means at $\phi_{ij2}$.

$\phi_{ij1}$: height at which major light beam of image height $Y_j$ crosses input lens surface of i-th image surface correction optical means $\phi_{ij2}$: height at which major light beam of image height $Y_j$ crosses output lens surface of i-th image surface correction optical means.

In the present invention, a lens 30 having the following relation is used:

$$\Delta(Y_j) < 0 \text{ where } \phi_{ij1} = \hat{L}/3 \text{ and } \phi_{ij2} = \hat{L}/3,$$

L represents a length from deflecting means to an aspherical surface.

Preferably the following condition is satisfied:

$$-1 \times 10^{-1} < \Delta(Y_j)/\hat{L} < -5 \times 10^{-5}$$

It is preferable that as an image height is increased, its refractive index can be decreased by using an optical means 30, so that a convergent point is moved onto the surface of an image forming body 16, and a curvature of field can be effectively corrected.

The optical means 30 for correcting the curvature of field has at least one aspherical surface in order to decrease a refracting power at a main-scanning section falling outside the optical axis, and a deviation ΔZ from a paraxial generating spherical surface to the aspherical surface is designated to satisfy the following relation:

$$\Delta(Y_j) = {}_i\Sigma\{\Delta Z_{ij1}(\phi_{ij1}) - \Delta Z_{ij2}(\phi_{ij2})\} < 0 \quad (1)$$

$$\Delta(Y_j) < \Delta(Y_k) < 0 \ (Y_j < Y_k) \quad (2)$$

Therefore, in the optical means 30 for correcting the curvature of field, the number of lenses to be used is not limited, but lenses must be combined to satisfy at least the above relationship.

Note that each lens preferably has a low refracting power. This is because an aspherical shape can be realized by a plastic lens, and hence, the cost of the optical means 30 can be reduced. In addition, an environmental change of plastic is small when a refracting power is low. Of course, in the case of plastic molding, when the thickness of a lens portion on the optical axis is substantially equal to that of a peripheral lens portion, this contributes to improvement of molding precision.

Figure 5:
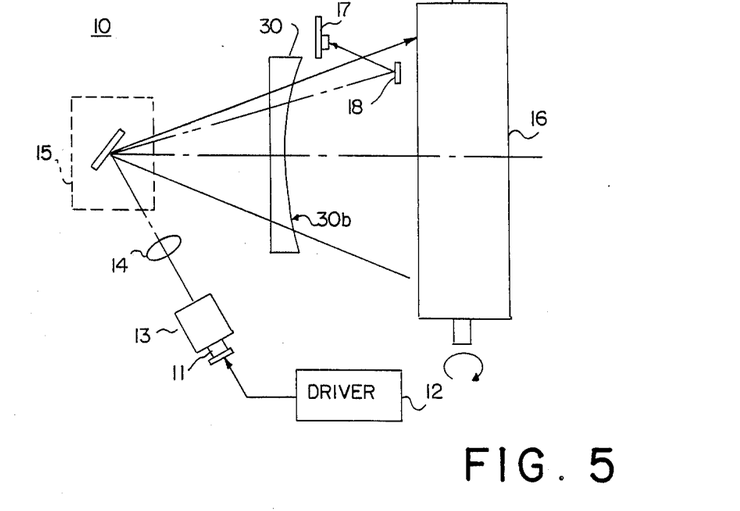
FIG. 5 is also a diagrammatical illustration of another embodiment of an optical scanning device for use in an image recording apparatus according to the present invention.

FIG. 4 shows an example of the optical means 30 constituted by a single lens having an aspherical surface 30a at a beam input side (objective field side). FIG. 5 shows an example of the optical means 30 constituted by a single lens having an aspherical surface 30b at a beam output side (image field side), contrary to FIG. 4.

In this manner, when the optical manner 30 is constituted by a single lens, the deviation ΔZ in FIG. 4 is as follows.

Figure 6:
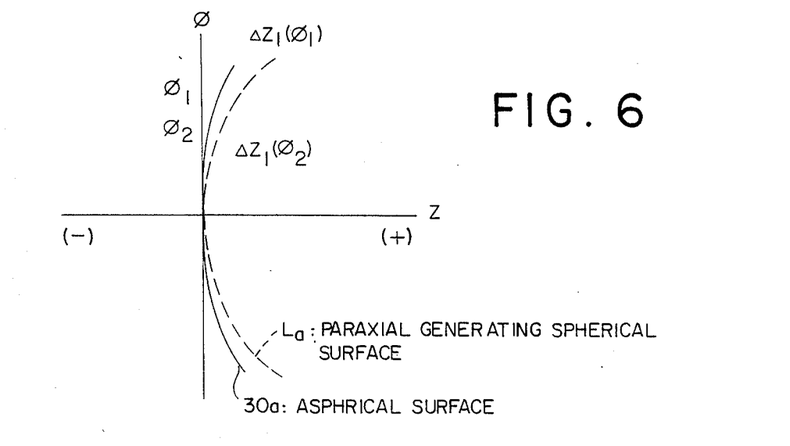
FIGS. 6, 7 and 8 are views for explaining an operation for correcting a curvature of field.

A light beam propagation direction is given as Z, and an image height is given as φ, as shown in FIG. 6. A paraxial generating spherical surface at a beam output surface side of the optical means 30, which serves to correct a curvature of image height, is given as La, and a beam propagation direction is represented by "+" and an opposing direction is represented by "−" with reference to the paraxial generating spherical surface La.

In this case, the aspherical surface 30a is designed to be located outside the paraxial generating spherical surface La.

Therefore, if deviations of the aspherical surface 30a from the paraxial generating spherical surface La for image heights φ1 and φ2 are respectively given as ΔZ1(φ1) and ΔZ1(φ2), the aspherical surface 30a can be molded as follows:

$$\Delta Z_1(\phi_1) < \Delta Z_1(\phi_2) < 0 \quad (3)$$

for $|\phi_1| < |\phi_2|$

Figure 7:
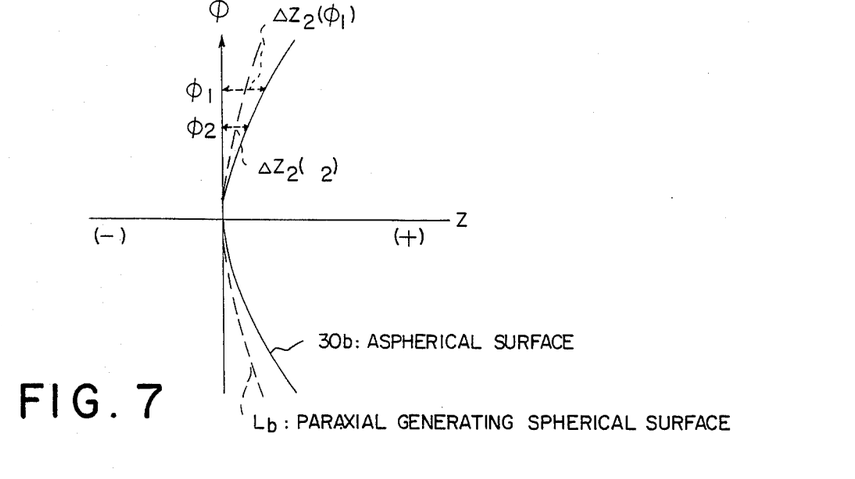

In contrast to this, when the aspherical surface 30b is formed at the beam output side, as shown in FIG. 5, it is formed to be curved outward from a paraxial generating spherical surface Lb (toward the image forming body 16), as shown in FIG. 7. A deviation at each image height is selected as follows:

$$0 < \Delta Z_2(\phi_2) < \Delta Z_2(\phi_1) \quad (4)$$

for $|\phi_1| < |\phi_2|$

Unlike FIGS. 4 and 5, when a large number of aspherical surfaces are used, the number of lenses to be used and the shape of the aspherical surface are selected to satisfy equation (1).

When the shape of the aspherical surface of the optical means 30 is selected to be a predetermined curved surface, the curvature of field and distortion on the image forming body 16 can be corrected to practically negligible levels.

An embodiment of the optical means 30 used in the optical scanning device 10 according to the present invention, and a correcting state of a curvature of field at that time will be described hereinafter with reference to FIG. 8 and the following drawings.

Figure 8:
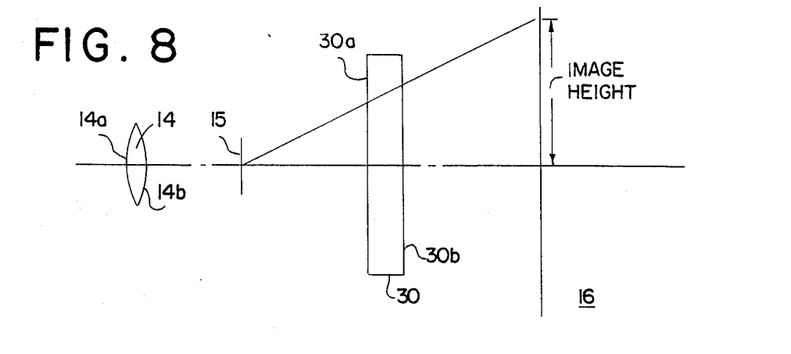

As shown in FIG. 8, in a plurality of optical elements arranged along an optical path, a radius of curvature of the condenser lens 14 is given as R (a radius when viewed from the light beam propagation direction is indicated by "+"), a beam incident distance among the optical elements is given as D, and a refractive index is given as N.

As shown in FIG. 8, when the optical means 30 has flat side surfaces 30a and 30b, the relationship among R, D, and N is as shown in Table 1.

TABLE 1

| Inter-Surface | Radius (mm) | Distance (mm) | Refractive Index N |
|---|---|---|---|
| 14a–14b | 500.000 | 4.00 | 1.50000 |
| 14b–15 | −500.000 | 15.00 | 1 |
| 15–30a | — (mirror surface) | 153.00 | 1 |
| 30a–30b | ∞ | 10.00 | 1.50000 |
| 30b–16 | ∞ | 324.50 | 1 |

Figure 9:
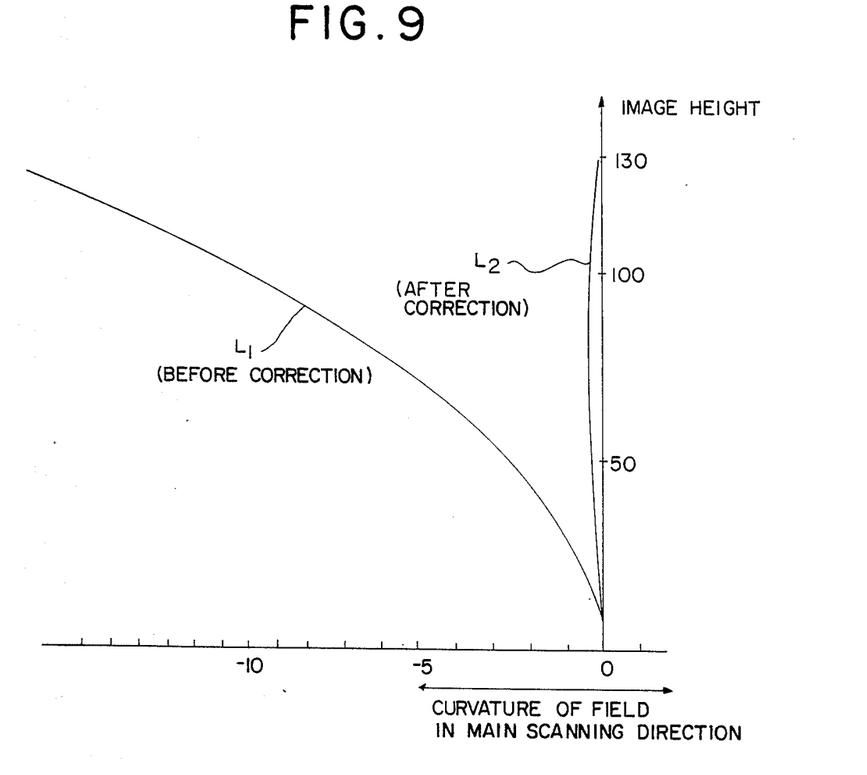
FIG. 9 is a graph showing curves representing curvatures of field in connection with the optical scanning device shown in FIG. 4.

When the optical system is selected as shown in Table 1, and the optical means 30 having two flat surfaces is used, the curvature of field in the main scanning direction with respect to an image height is as represented by a curve L1 in FIG. 9. More specifically, as the image height is increased, a refractive index is increased. Thus, focal points are curved as shown in FIG. 9.

When the optical means 30 having an aspherical surface is used, the curvature of field is as follows. Note that a case will be exemplified wherein the optical means 30 has the aspherical surface 30a at the input side, as shown in FIG. 4. The condenser lens 14 has a focal length of 500 mm.

In this case, the aspherical surface Z is expressed by the following equation:

$$Z = \{C\phi^2/(1+\sqrt{1-C^2\phi^2}) + {}_i\Sigma A_i\phi^{P_i}\} \quad (5)$$

Since C = 1/R and R = ∞, then C = 0.

The second term in the above equation represents the deviation Z of the aspherical surface 30a. When coefficients A and P representing the deviation ΔZ having the values shown in Table 2 are used, the image heights on the image forming body 16 and the aspherical surface deviation (aspherical surface amount) ΔZ of the optical means 30 are as shown in Table 3.

TABLE 2

| Ai | Pi |
|---|---|
| A1 = −1.42980 × $10^{-8}$ | P1 = 4.0000 |
| A2 = −7.60635 × $10^{-15}$ | P2 = 6.0000 |
| A3 = −7.59422 × $10^{-21}$ | P3 = 8.0000 |
| A4 = −1.11838 × $10^{-26}$ | P4 = 10.0000 |
| A5 = −1.85746 × $10^{-32}$ | P5 = 12.0000 |
| A6 = −3.14674 × $10^{-38}$ | P6 = 14.0000 |
| A7 = −5.27756 × $10^{-44}$ | P7 = 16.0000 |
| A8 = −8.65670 × $10^{-50}$ | P8 = 18.0000 |
| A9 = −1.39635 × $10^{-55}$ | P9 = 20.0000 |

TABLE 3

| Image Height On Drum | Image Height On 30a | Deviation ΔZ on Surface 30a | Image Height On 30b | Deviation ΔZ On Surface 30b |
|---|---|---|---|---|
| 125.63 | 39.495 | −0.03482 | 41.204 | 0.000 |
| 68.552 | 21.633 | −0.00313 | 22.572 | 0.000 |

As a result, the curvature of field with respect to the image height when the optical means 30 described above is used is as represented by a curve L2 in FIG. 9.

As can be seen from the curve L2, when the optical means 30 having the aspherical surface is used, the curvature of field and the distortion can be corrected to substantially negligible levels.

Figure 10:
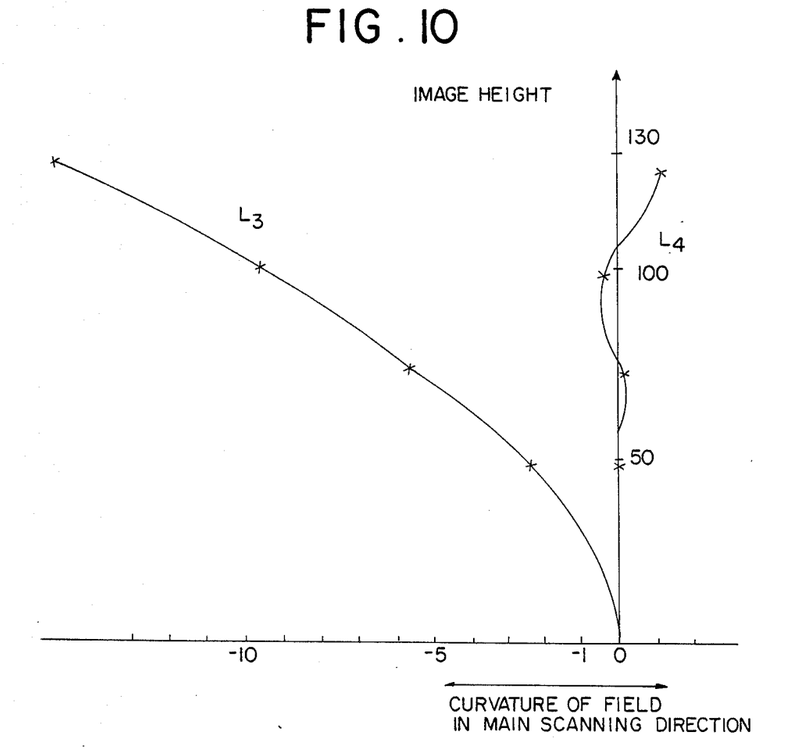
FIG. 10 is a graph showing curves representing curvatures of field in connection with the optical scanning device shown in FIG. 5.

Tables 4, 5 and 6 and FIG. 10 show detailed numerical values and characteristic curves when the optical means 30 having an aspherical surface at a beam input side is used according to an embodiment corresponding to FIG. 5. The focal length of the condenser lens 14 is selected to be 300 mm in this case.

TABLE 4

| Inter-Surface | Radius (mm) | Distance (mm) | Refractive Index N |
|---|---|---|---|
| 14a–14b | 500.000 | 4.00 | 1.50000 |
| 14b–15 | −500.000 | 15.00 | 1 |
| 15–30a | — | 153.00 | 1 |
| (mirror surface) | | | |
| 30a–30b | ∞ | 10.00 | 1.50000 |
| 30b–16 | ∞ | 324.50 | 1 |

TABLE 5

| Ai | Pi |
|---|---|
| A1 = 1.46110 × $10^{-8}$ | P1 = 4.0000 |
| A2 = 3.72120 × $10^{-14}$ | P2 = 6.0000 |
| A3 = 6.48693 × $10^{-20}$ | P3 = 8.0000 |
| A4 = 1.08748 × $10^{-25}$ | P4 = 10.0000 |
| A5 = 1.84900 × $10^{-31}$ | P5 = 12.0000 |
| A6 = 3.14400 × $10^{-37}$ | P6 = 14.0000 |
| A7 = 5.27137 × $10^{-43}$ | P7 = 16.0000 |
| A8 = 8.66272 × $10^{-49}$ | P8 = 18.0000 |
| A9 = 1.39635 × $10^{-54}$ | P9 = 20.0000 |

TABLE 6

| Image Height On Drum | Image Height On 30a | Deviation ΔZ on Surface 30a | Image Height On 30b | Deviation ΔZ on Surface 30b |
|---|---|---|---|---|
| 125.63 | 39.504 | 0.000 | 41.202 | 0.04229 |
| 68.565 | 21.633 | 0.000 | 22.571 | 0.00380 |

The curve L3 shown in FIG. 10 is a characteristic curve before correction, and a curve L4 is a characteristic curve after correction.

Figure 11:
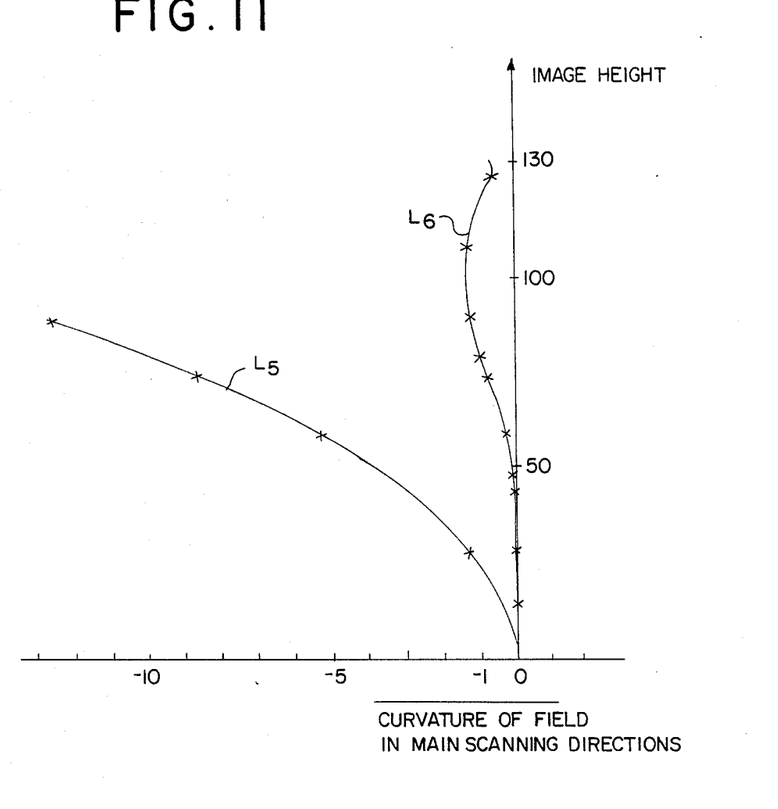
FIG. 11 is a graph showing curves representing curvatures of field in connection with the optical scanning device shown in FIG. 5.

Tables 7, 8 and 9 and FIG. 11 are identical drawings to those shown in Tables 4 to 6 and FIG. 10 when only the focal length is changed to be 500 mm.

TABLE 7

| Inter-Surface | Radius (mm) | Distance (mm) | Refractive Index N |
|---|---|---|---|
| 14a–14b | 300.000 | 4.00 | 1.50000 |
| 14b–15 | −300.000 | 15.00 | 1 |
| 15–30a | — | 135.00 | 1 |
| (mirror surface) | | | |
| 30a–30b | ∞ | 10.00 | 1.50000 |
| 30b–16 | ∞ | 142.50 | 1 |

TABLE 8

| Ai | Pi |
|---|---|
| A1 = 5.16244 × $10^{-8}$ | P1 = 4.0000 |
| A2 = −6.52351 × $10^{-13}$ | P2 = 6.0000 |
| A3 = 8.03265 × $10^{-17}$ | P3 = 8.0000 |
| A4 = 1.29250 × $10^{-22}$ | P4 = 10.0000 |
| A5 = 1.36580 × $10^{-28}$ | P5 = 12.0000 |
| A6 = 1.19846 × $10^{-34}$ | P6 = 14.0000 |
| A7 = 9.32080 × $10^{-41}$ | P7 = 16.0000 |
| A8 = 7.25877 × $10^{-47}$ | P8 = 18.0000 |
| A9 = 5.68570 × $10^{-52}$ | P9 = 20.0000 |

TABLE 9

| Image Height On Drum | Image Height On 30a | Deviation ΔZ on Surface 30a | Image Height On 30b | Deviation ΔZ on Surface 30b |
|---|---|---|---|---|
| 128.60 | 58.919 | 0.000 | 61.890 | 0.73816 |
| 58.366 | 27.557 | 0.000 | 28.907 | 0.03571 |

Referring to FIG. 11, a curve L5 is a characteristic curve before aspherical surface correction, and a curve L6 is a curve after correction.

Note that in Table 4 and the subsequent drawings, the same equation for calculating the aspherical surface as described above is employed.

As can be seen from these embodiments, the effect of correcting the aspherical surface differs depending on the focal length.

Figure 12A:
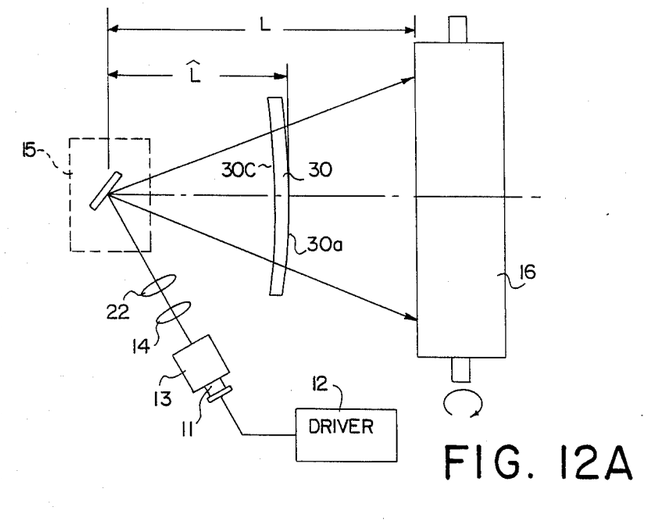
FIG. 12A is a diagrammatical illustration of the third embodiment of an optical scanning device for use in an image recording apparatus according to the present invention, as seen from the main scanning section.
Figure 12B:
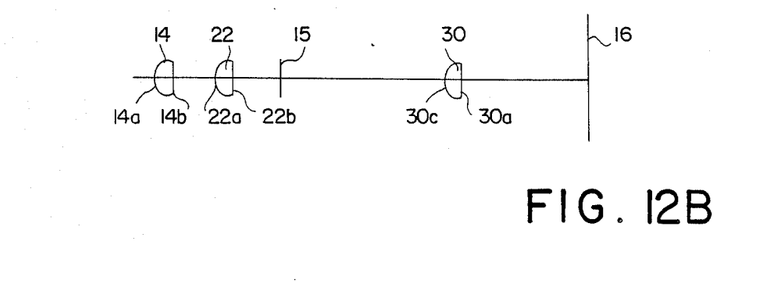
FIG. 12B is a diagrammatical illustration of the third embodiment as seen from the sub-scanning section.
Figure 13:
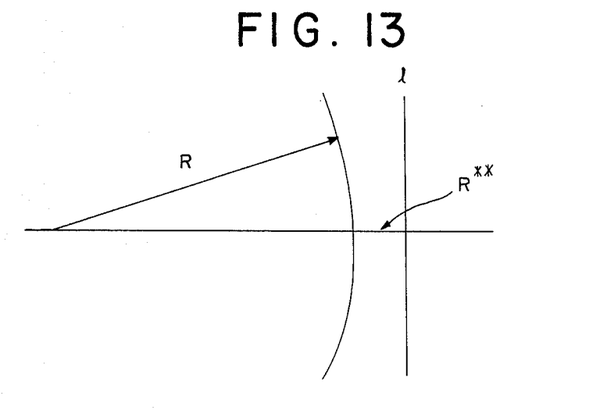
FIG. 13 shows designing of a cylindrical surface having radius of curvature $R^{**}$.

Referring to FIGS. 12A and 12B, the third embodiment wherein the surface correction optical means is a lens having an aspherical surface and a modified cylindrical surface, is explained. Employing a modified cylindrical surface works for image curvature correction of sub-scanning plane.

The modified cylindrical surface is preferably employed in concave surface of a lens. In case that the modified cylindrical surface is employed in convex surface, the image curvature correction effect of sub-scanning plane is not fully satisfactory.

The lens having a modified cylindrical surface in a concave surface is very effective when it is used in postobjective type.

In FIGS. 12A and 12B, correction optical means 30 has a convex aspherical surface 30a and a concave modified cylindrical surface 30c.

In the present invention, correction optical means has preferably the following relation:

$$-0.8 < L/f < 2.0,$$

wherein L is a length between the deflector and the image forming body, and f is a focusing length of a lens surface located between the deflector and the image forming body excluding the modified cylindrical surface, and in case that a plurality of lenses are existed therebetween, synthesis focusing length is calculated assuming the curvature radius for sub-scanning plane of the modified cylindrical surface be infinitive (∞).

Examples are shown in Tables 10 to 13.

TABLE 10

Figure 14:
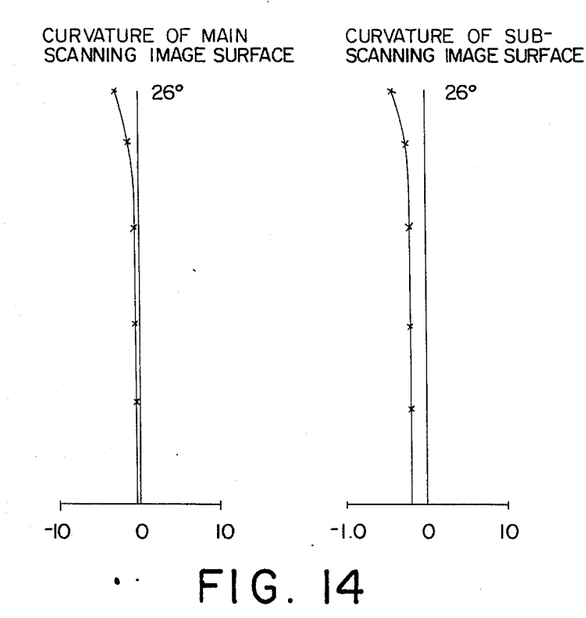
FIG. 14 is a graph showing curves representing curvature of field of the main image surface and the sub image surface.
Figure 15:
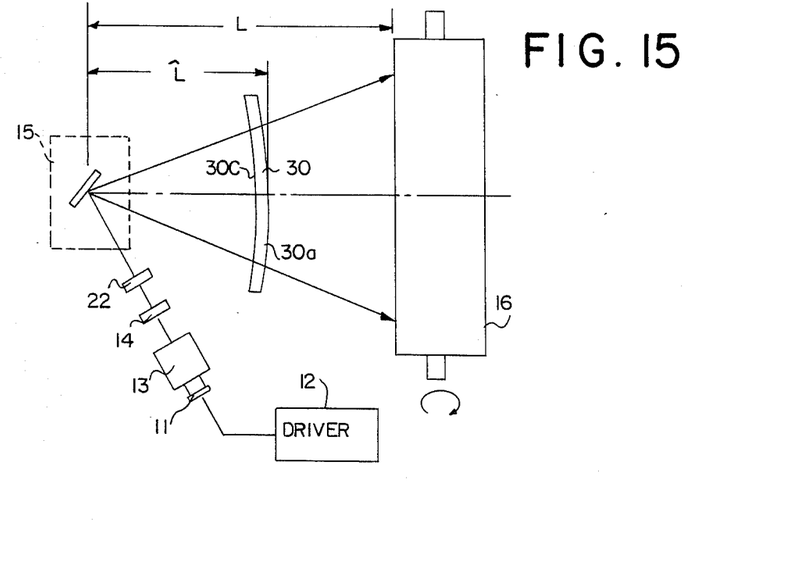
FIG. 15 is a diagrammatical illustration of an example of the third embodiment of an optical scanning device shown in FIGS. 12A and 12B.

(See FIGS. 14 and 15)

| Surface | R | D | N |
|---|---|---|---|
| 14a | 138.0 | 4.0 | 1.51072 |
| 14b | ∞ | 2.0 | |
| 22a* | ∞ | 3.0 | 1.51072 |
| 22b | ∞ | 16.0 | |
| 15 | ∞ | 125.0 | |
| 30c** | −415.0 | 5.0 | 1.48592 |
| 30a*** | −415.0 | 120.0 | |
| 16 | | | | wherein 22a is a cylindrical surface having R* (curvature radius on sub-scanning axis) is 15.0, 30c is a modified cylindrical surface having R**=32.5. 30a is a rotating aspherical surface having following coefficients.

A2 = 0
A4 = 0.866018 × $10^{-7}$
A6 = 0.127903 × $10^{-11}$
A8 = −0.745163 × $10^{-16}$
A10 = −0.244909 × $10^{-20}$
L/f = 250/853.99 = 0.2927
$\Delta(Y_j)/L$ = −0.31285/130 = −2.4065 × $10^{-3}$
W/2 = 26°, Wavelength λ: 780 nm,
Beam spot of incidence light:
main scanning direction: 3.4 mm
sub-scanning direction: 0.21 mm The cylindrical lens is located before the condenser lens.

TABLE 11

Figure 16:
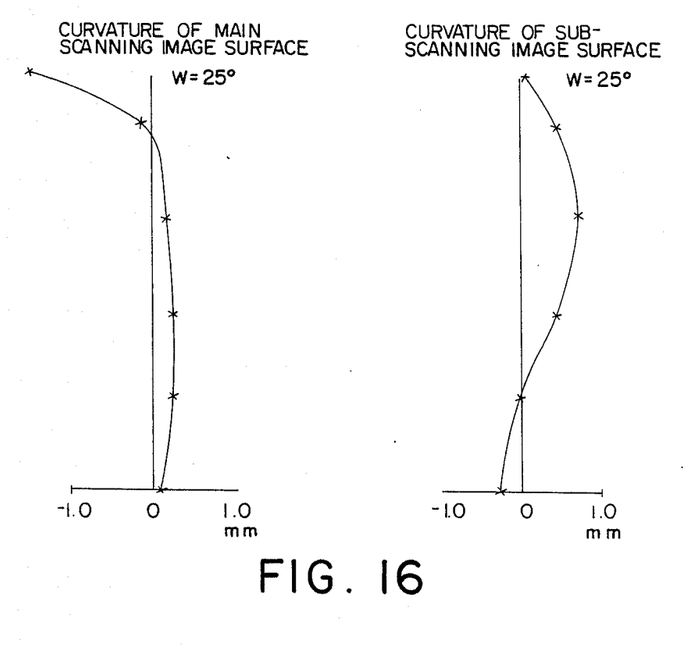
FIG. 16 is a graph showing curves representing curvature of field of the main image surface and the sub image surface.
Figure 17:
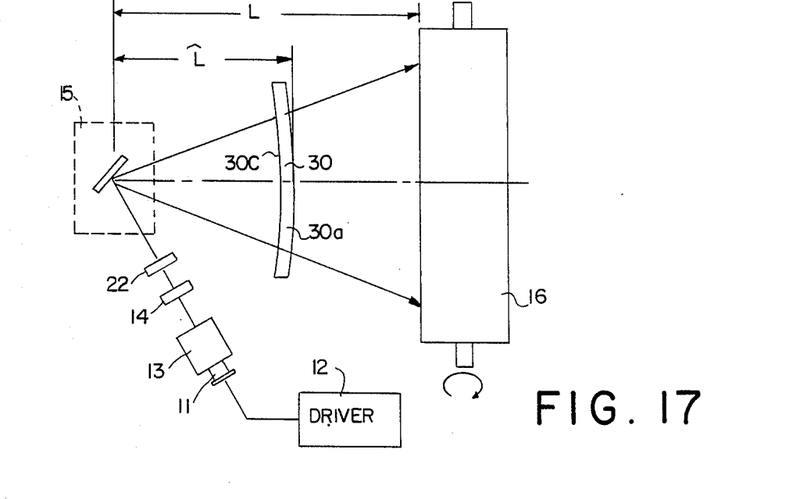
FIG. 17 is a diagrammatical illustration of another example of the third embodiment shown in FIGS. 12A and 12B.

(See FIGS. 16 and 17)

| Surface | R | D | N |
|---|---|---|---|
| 22a* | ∞ | 4.0 | 1.51072 |
| 22b | ∞ | 0.9 | |
| 14a | 142.4 | 4.0 | 1.51072 |
| 14b | ∞ | 40.0 | |
| 15 | ∞ | 50.0 | |
| 30c** | −90.0 | 5.0 | 1.48595 |
| 30a*** | −100.0 | 206.7 | |
| 16 | ∞ | | | wherein 22a is a cylindrical surface having R* (curvature radius on sub-scanning axis) is 27.54, 30c is a modified cylindrical surface having R**=24.35. 30a is a rotating aspherical surface having following coefficients.

A2 = 0
A4 = 0.205977 × $10^{-6}$
A6 = 0.107953 × $10^{-9}$
A8 = −0.236044 × $10^{-12}$
A10 = −0.158337 × $10^{-15}$
L/f = 261.7/205.78 = 1.27
$\Delta(Y_j)/L$ = 0.021504/55.0 = 3.9099 × $10^{-4}$
W/2 = 25°, Wavelength λ: 780 nm,
Beam spot of incidence light:
main scanning direction: 3.8 mm
sub-scanning direction: 1.56 mm Example of using no cylindrical lens 22.

TABLE 12

Figure 18:
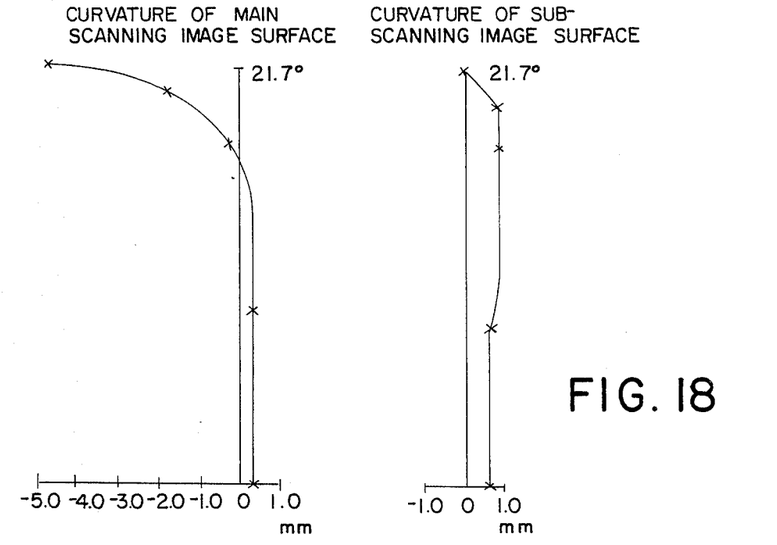
FIG. 18 is a graph showing curves representing curvature of field of the main image surface and the sub image surface.
Figure 19:
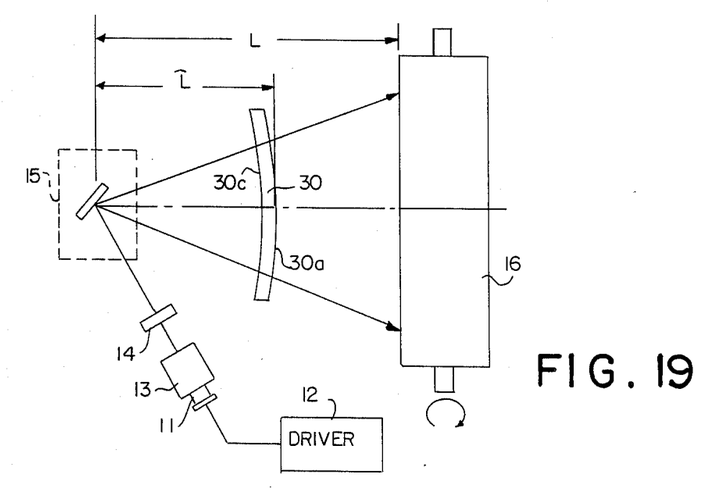
FIG. 19 is a diagrammatical illustration of a further example of the third embodiment shown in FIGS. 12A and 12B.

(See FIGS. 18 and 19)

| Surface | R | D | N |
|---|---|---|---|
| 14a | 151.5 | 4.0 | 1.51072 |
| 14b | ∞ | 40.0 | |
| 15 | ∞ | 185.5 | |
| 30c** | −1800.0 | 5.0 | 1.48595 |

TABLE 12-continued (See FIGS. 18 and 19)

| Surface | R | D | N |
|---|---|---|---|
| 30a*** | −1800.0 | 65.0 | |
| 16 | | | | wherein 30c is a modified cylindrical surface having R**=27.0 30a is a rotating aspherical surface having following coefficients.

A2 = 0
A4 = 0.146185 × $10^{-6}$
A6 = 0.108679 × $10^{-11}$
A8 = 0.969846 × $10^{-15}$
A10 = −0.671955 × $10^{-19}$
L/f = 255.5/3704.08 = 0.069
$\Delta(Y_j)/L$ = −2.6328/190.5 = −1.382 × $10^{-2}$
W/2 = 21.7°, Wavelength λ: 780 nm,
Beam spot of incidence light:
main scanning direction: 3.8 mm
sub-scanning direction: 0.34 mm

TABLE 13

(See FIGS. 15 and 16)

| Surface | R | D | N |
|---|---|---|---|
| 22a* | ∞ | 4.0 | 1.51072 |
| 22b | ∞ | 34.7 | |
| 14a* | 138.0 | 4.0 | 1.51072 |
| 14b | ∞ | 2.0 | |
| 15 | ∞ | 125.0 | |
| 30c** | −415.0 | 5.0 | 1.48592 |
| 30a*** | −415.0 | 120.0 | |
| 16 | | | | wherein 22a is a cylindrical surface having R (curvature radius on sub-scanning axis) is 35.50, 30c is a modified cylindrical surface having r=32.5. 30a is a rotating aspherical surface having following coefficients.

A2 = 0
A4 = 0.866018 × $10^{-7}$
A6 = 0.127903 × $10^{-11}$
A8 = −0.745163 × $10^{-16}$
A10 = −0.244909 × $10^{-20}$
L/f = 250/853.99 = 0.2927
$\Delta(Y_j)/L$ = −0.31295/130 = −2.4065 × $10^{-3}$
W/2 = 26°, Wavelength λ: 780 nm,
Beam spot of incidence light:
main scanning direction: 3.4 mm
sub-scanning direction: 0.5 mm As can be understood from these embodiments, the curvature of field can be corrected by using the optical means 30 having the aspherical surface. However, the distortion cannot be satisfactorily corrected. This causes a slight degradation of uniformity of the scanning speed on the image forming body 16.

A variation in scanning speed can be corrected such that an output timing (dot clock) of image information which is output at equal intervals is modulated in accordance with the scanning speed.

The variation in scanning speed appears as a variation in dot exposure amount on the image forming body 16. The exposure amount E is given by:

$$E = Pt \qquad (6)$$

where P is a light amount on the image forming body 16, and t is a scanning time required for forming one dot.

Therefore, a change in dot clock of image information, i.e., a change in scanning time t causes a change in exposure amount E, resulting in nonuniform image density.

Figure 20:
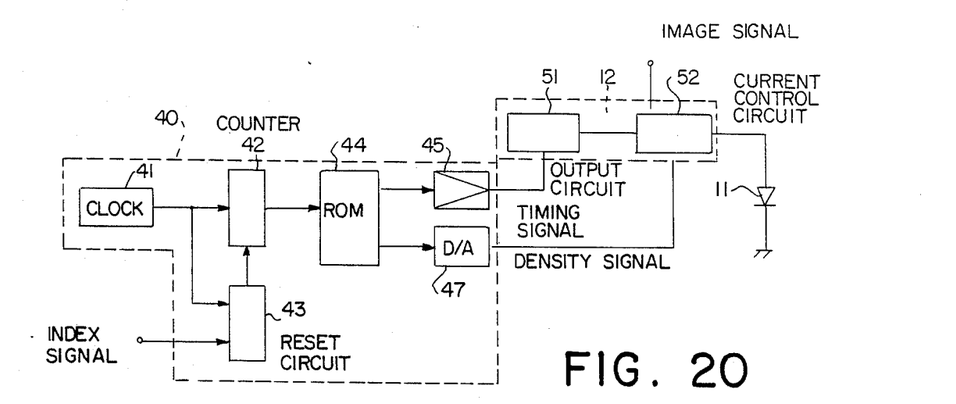
FIG. 20 is a diagram showing a circuit for controlling a scanning speed and density.

In order to prevent such a variation in scanning speed and a variation in exposure amount, a laser control circuit 40 shown in FIG. 20 can be used for the driver 12 of the semiconductor laser 11.

In FIG. 20, reference numeral 41 denotes a reference clock generator. A reference clock is supplied to a counter 42 and a reset circuit 43. A reset signal is formed in synchronism with the index signal. Thus, the counter 42 is reset every line.

A counter output is supplied to a ROM 44 as an address signal, and data in accordance with a change in scanning speed (data serving as a pulse train of dot clocks) is accessed in correspondence with the address. In this case, the reference clock has a frequency n times (n is a positive number) that of a dot clock for outputting an image signal.

The data corresponding to the pulse train is supplied to an image signal output circuit 51 provided to the driver 12 through a buffer 45. The image signal output circuit 51 also receives a signal corresponding to image information, and the output timing of the image signal is controlled by the dot clock pulse train.

For example, when the scanning speed is lower than a reference value, control is made to increase intervals of the output pulse train.

The pulse train signal output from the ROM 44 is supplied to a D/A converter 47 to be converted to an analog signal. The analog signal is supplied to a current control circuit 52 as a current control signal. The current control circuit 52 controls a drive current (excitation current) for the semiconductor laser 11. When the drive current is increased, a light emission amount is increased.

Therefore, when control is made to increase the scanning speed, the drive current is increased accordingly. Then, even if the scanning time is shortened, the exposure amount E can be made constant. More specifically, even if the scanning speed is changed, the exposure amount can be kept constant, and uniformity of an image density can be assured.

In the embodiments shown in FIG. 4 and the subsequent drawings, when a cylindrical lens is inserted immediately after the collimator lens 13, the optical means 30 is also provided with the effect of the cylindrical lens, so that the wobble of the light deflector 15 can also be corrected.

As described above, according to the present invention, since a post-objective type optical system is used as an optical system for an optical scanning device, the structure of the condenser lens can be rendered very simple. The curvature of field and distortion as drawbacks of the postobjective type optical system can be corrected using an optical system constituted by a plastic lens or the like.

Since this optical means does not require highprecision machining unlike a focusing lens used in a preobjective type optical system, its structure is very simple, and machining is very easy. As a result, an inexpensive optical means can be provided, and the cost of the optical system can be reduced.

Therefore, the present invention is very suitable for an optical scanning device of, e.g., an electrophotographic color copying machine, a laser printer, and the like.

What we claim is:

1. An image recording apparatus comprising:
   a light beam generator;
   a focusing element for focusing a light beam generated by said light beam generator onto a recording media,
   a deflector for deflecting the light beam after passage thereof through said focusing element, so that the light beam scans a recording medium to record predetermined image information; and
   an image surface correcting optical means arranged between said deflector and said recording medium for correcting a curvature of field in the main scanning direction;
   wherein at least one surface of said image surface correction optical means comprises an aspherical surface, and a deviation $\Delta Z$ from a paraxial generating spherical surface to the aspherical surface is represented by the following relations:

$$\Delta(Y_j) = _i\Sigma\{\Delta Z_{ij1}(\phi_{ij1}) - \Delta Z_{ij2}(\phi_{ij2})\} < 0$$
$$\phi_{ij1} = \hat{L}/3, \phi_{ij2} = \hat{L}/3$$

where
$Y_j, Y_k$: image height on recording medium
$\Delta Z_{ij1}(\phi_{ij1})$: aspherical surface deviation at input surface of i-th image surface correction optical means at $\phi_{ij1}$,
$\Delta Z_{ij2}(\phi_{ij2})$: aspherical surface deviation at output surface of i-th image surface correction optical means at $\phi_{ij2}$,
$\phi_{ij1}$: height at which major light beam of image height $Y_j$ crosses input lens surface of i-th image surface correction optical means,
$\phi_{ij2}$: height at which major light beam of image height $Y_j$ crosses output lens surface of i-th image surface correction optical means,
L: a length from deflecting means to an aspherical surface.

2. An image recording apparatus according to claim 1, wherein the following relation is satisfied:

$$-2.0 \times 10^{-2} < \Delta Y_j/\hat{L} < -1 \times 10^{-5},$$
$$\phi_{ij1} = \hat{L}/3, \phi_{ij2} = \hat{L}/3.$$

3. An apparatus according to claim 1, wherein the image surface correction optical means has a following relation:
$$-0.8 < L/f < 2.0,$$

wherein L is a length between the deflector and the image forming body, and f is focusing length of a lens surface located between the deflector and the image forming body excluding the modified cylindrical surface.

4. An image recording apparatus according to claim 1, wherein said image surface correction optical means is made of plastic material.

5. An image recording apparatus according to claim 1, wherein said image surface correction optical means is comprised of single lens.

6. An image recording apparatus according to claim 1, wherein the image surface correction optical means has a modified cylindrical surface.

7. An image recording apparatus according to claim 6, wherein the modified cylindrical surface is provided in concave surface.

8. An image recording apparatus comprising:
a light beam generator:
a focusing element for focusing a light beam generated by said light beam generator:
a deflector for deflecting the light beam passing through said focusing element, so that the light beam scans a recording medium to record predetermined image information: and
an image surface correction optical means arranged between said deflector and said recording medium for correcting a curvature of field in the main scanning direction:
wherein at least one surface of said image surface correction optical means comprises an aspherical surface, and a deviation $\Delta Z$ from a paraxial generated spherical surface to the aspherical surface is represented by the following relations:

$$\Delta(Y_j) = {}_i\Sigma\{\Delta Z_{ij1}(\phi_{ij1}) - \Delta Z_{ij2}(\phi_{ij2})\} 0 \quad (1)$$

$$(Y_j) < \Delta(Y_k) < 0(Y_j < Y_k) \quad (2)$$

where
$Y_j, Y_k$: image height on recording medium $\Delta Z_{ij1}(\phi_{ij1})$: aspherical surface deviation at input surface of i-th image surface correction optical means $\Delta Z_{ij2}(\phi_{ij2})$: aspherical surface deviation at output surface of i-th image surface correction optical means $\phi_{ij1}$: height at which major light beam of image height $Y_j$ crosses input lens surface of i-th image surface correction optical means, $\phi_{ij2}$: height at which major light beam of image height $Y_j$ crosses output lens surface of i-th image surface correction optical means.

9. An apparatus according to claim 8, wherein the image surface correction optical means is in accordance with: wherein L is a length between the deflector and the image forming body, and f is a focusing length of a lens surface located between the deflector and the image forming body excluding any modified cylindrical surface.

10. An image recording apparatus according to claim 8, wherein said image surface correction optical means is made of plastic material.

11. An image recording apparatus according to claim 8, wherein said image surface correction optical means is comprised of single lens.

12. An image recording apparatus according to claim 8, wherein the image surface correction optical means has a modified cylindrical surface.

13. An image recording apparatus according to claim 12, wherein the modified cylindrical surface is provided in a concave surface.

* * * * *